United States Patent [19]
Soda et al.

[11] 3,958,209
[45] May 18, 1976

[54] HIGH TEMPERATURE THERMISTOR

[75] Inventors: Kazuya Soda, Takahama; Naoto Miwa, Kariya, both of Japan

[73] Assignee: Nippondenso Co., Ltd., Japan

[22] Filed: Feb. 4, 1975

[21] Appl. No.: 547,095

[30] Foreign Application Priority Data
  Feb. 28, 1974  Japan.................. 49-24670

[52] U.S. Cl................... 338/22 R; 252/518
[51] Int. Cl.².......................... H01C 7/04
[58] Field of Search............. 338/22, 23, 25; 252/518, 520

[56] References Cited
UNITED STATES PATENTS

| | | |
|---|---|---|
| 2,590,893 | 4/1952 | Sanborn.................. 252/520 |
| 3,496,512 | 2/1970 | Matsuoka et al. ............ 338/22 R X |
| 3,503,029 | 3/1970 | Matsuoka..................... 338/22 R X |
| 3,723,175 | 3/1973 | Matsuyama et al............. 252/518 X |

*Primary Examiner*—C. L. Albritton
*Attorney, Agent, or Firm*—Cushman, Darby & Cushman

[57]  ABSTRACT

Thermistors having a resistor which comprises aluminum oxide ($Al_2O_3$) and chromium oxide ($Cr_2O_3$) are excellent in heat resistance even when they are used at a high temperature of 400° – 1,100°C. Proportion of $Al_2O_3$ and $Cr_2O_3$ is preferably 11 mol % of $Cr_2O_3$ and 89 mol % – 6 mol % of $Al_2O_3$. Furthermore, calcium oxide and silicon oxide may be added to accelerate the sintering of the $Al_2O_3$ and $Cr_2O_3$. In addition, manganese oxide or titanium oxide may be contained in the resistor for more accurate control of temperature.

7 Claims, 5 Drawing Figures

HIGH TEMPERATURE THERMISTOR

BACKGROUND OF THE INVENTION

This invention relates to high temperature thermistors utilizable even at such a high temperature as 400° – 1100°C and usable for detection of temperature of exhaust gas in internal combustion engine, temperature in furnaces, etc.

The conventional high temperature thermistors greatly vary in their resistance when used at a high temperature for a long period of time and thus have difficulties in heat resistance.

In view of these problems, the inventors have made extensive researches to find that use of chromium oxide and aluminum oxide as main component of heat resisting resistor which is an essential part of high temperature thermistors can solve the difficulty in heat resistance.

SUMMARY OF THE INVENTION

The inventors have examined the range of temperature at which the high temperature thermistors having said heat resisting resistor can be used to find that such range is 400° – 1,000°C. That is, at a temperature lower than 400°C the usual thermistors can be satisfactorily used and when the high temperature thermistors are used at such low temperature, resistance becomes too high to be practically used. At a temperature higher than 1100°C, use of a long period of time causes conspicuous variation in resistance and also the high temperature thermistors have no practical use at such a high temperature. The inventors have made researches on value B (thermistor constant) of the high temperature thermistor required for the ordinary temperature controlling circuits at a temperature of 400° – 1100°C which has been obtained as the results of researches on the range of temperature at which the high temperature thermistors can be used. They have found that a value B of 3,000°K – 20,000°K and a resistance of 0.1 KΩ – 500 KΩ are necessary.

Next, the inventors have examined range of amount of the main component in the heat resisting resistor, namely those of chromium oxide and aluminum oxide which satisfy said ranges of value B and resistance at a temperature of 400° – 1,100°C. As the results, it has been found that ranges of amount of chromium oxide and aluminum oxide are 11 – 94 mol % and 89 – 6 mol %, respectively. See FIG. 3.

The inventors have made further researches on the effects of addition of calcium oxide and silicon oxide which have effect of acceleration of sintering of a composition comprising chromium oxide and aluminum oxide in the amounts as mentioned above on improvement in heat resistance which is to be attained by using chromium oxide and aluminum oxide as main components of the heat resisting resistor. As the results, it has been found that when 2 – 20 % by weight of calcium oxide and 2 – 20 % by weight of silicon oxide based on the weight of said mixture of chromium oxide and aluminum oxide are added, no reduction in heat resistance is caused with increase in acceleration of sintering. That is, in the case of less than 2 %, variation of resistance caused by use of the thermistor for a long period of time is great and heat resistance is low and in the case of more than 20 %, sintering temperature lowers to less than 1,500°C to result in reduction in heat resistance.

Value B and resistance required for ordinary temperature control are as mentioned above, but it has also been found that for more accurate temperature control a value B and resistance are preferably 6,000° – 18,000°K and 0.1 – 50 KΩ, respectively, at a temperature of 400° – 1,100°C. As the result of research on compositions satisfying such narrow ranges of value B and resistance, it has been found that addition of titanium oxide or manganese oxide as a third component besides said chromium oxide and aluminum oxide can result in the value B and resistance of the narrow ranges. However, in order for the value B of 6,000° – 18,000°K and the resistance of 0.1 – 50 KΩ to be satisfied, it is necessary that the compositions contain 0.5 – 30 mol % of manganese oxide and the balance of 99.5 – 70 mol % being chromium oxide and aluminum oxide or the compositions consist of 2 – 50 mol % of titanium oxide and the balance of 98 – 50 mol % of chromium oxide and aluminum oxide. See FIGS. 4 and 5.

It is therefore, the first object of this invention to provide high temperature thermistors which are improved in heat resistance and which have a value B of 3,000° – 20,000°K and a resistance of 0.1 – 500 KΩ at a temperature of 400° – 1,100°C.

It is the second object of this invention to provide high temperature thermistors which are also improved in heat resistance and which have a value B of 6,000°–1,800°K and a resistance of 0.1 – 50 KΩ at a temperature of 400° – 1,100°C.

BRIEF DESCRIPTION OF THE DRAWING

For a better understanding of the present invention, reference is made to the following detailed disclosure of embodiments of the invention taken in conjunction with the accompanying drawings thereof, wherein.

DESCRIPTION OF THE PREFERRED EMBODIMENTS

Examples for attaining the first object will be explained below.

Figure 1:
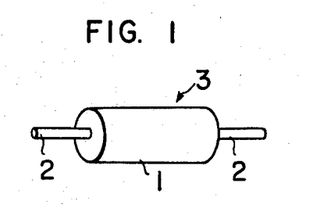
FIGS. 1 and 2 are oblique and cross-sectional views of the high temperature thermistor of the present invention, respectively.
Figure 2:
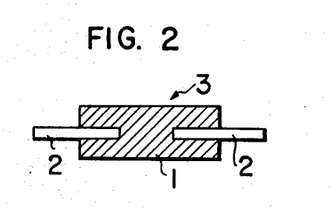

Aluminum oxide ($Al_2O_3$), chromium oxide ($Cr_2O_3$), calcium carbonate ($CaCO_3$) and silicon oxide ($SiO_2$) were respectively prepared. A suitable amount of $Al_2O_3$ and $Cr_2O_3$ was respectively weighed. To these $Al_2O_3$ and $Cr_2O_3$ were added $CaCO_3$ and $SiO_2$ which are sintering accelerating agent in an amount of 5 – 40 % based on the weight of $Al_2O_3$ and $Cr_2O_3$. The mixture was introduced into a pot together with water and the content was mixed and ground for several hours. After the mixing and grinding, the powders were dried to evaporate water and then pressed to obtain a columnar shaped body of 3 mm in diameter and 10 mm in length. Holes of 3 mm in depth were excavated at both ends of said shaped body and electrodes made of platinum wire were inserted into said holes. After the insertion, this was fired at 1,670°C for 4 hours in a furnace to obtain a high temperature thermistor 3 which comprises a heat resisting resistor 1 mainly composed of $Al_2O_3$ and $Cr_2O_3$, to the both ends of which electrodes 2 of platinum wire were connected as shown in FIGS. 1 and 2. Initial resistance and value B of the high temperature thermistors 3 having various mixing ratio of $Al_2O_3$ and $Cr_2O_3$ in the heat resisting resistor 1 were measured at 650°C and 750°C. The heat resisting resistors 3 were kept at 700°C, 900°C and 1,100°C for 100 hours, 500 hours and 1,000 hours and then resistance thereof was again measured at 750°C. Changing rate of the latter resistance to the initial resistance was calculated to accomplish heat resisting test. The results are shown in Table 1. The value B was calculated from the formula;

$$\frac{\ln R_1 - \ln R_2}{1/T_1 - 1/T_2}$$

(wherein $R_1$ is a resistance at an absolute temperature $T_1(°K)$ and $R_2$ is a resistance at $T_2(°K)$). Moreover, the changing rate of the resistance was calculated from the formula:

$$\frac{\text{Initial resistance} - \text{Resistance after heat resisting test}}{\text{Initial resistance}} \times 100$$

The sign "+" in Table 1 indicates that the resistance after the heat resisting test is greater than the initial resistance and the sign "−" indicates that the former is smaller than the latter.

As is clear from Table 1, the good results of the changing rate of the resistance after the heat resisting test being within ±5 % on average were obtained regardless of mixing ration of $Al_2O_3$ and $Cr_2O_3$. From the results, it can be recognized that when the heat resisting resistor 1 is produced from a mixture of $Al_2O_3$ and $Cr_2O_3$, high heat resistance at a high temperature can be obtained. Judging from the changing rates of resistance at 700°C, 900°C and 1,000°C which are evaluation temperatures in the heat resisting test as shown in Table 1, it is presumed that changing rate of resistance when the heat resisting test is carried out at 400°C is within the range of ±5 %.

Figure 3:
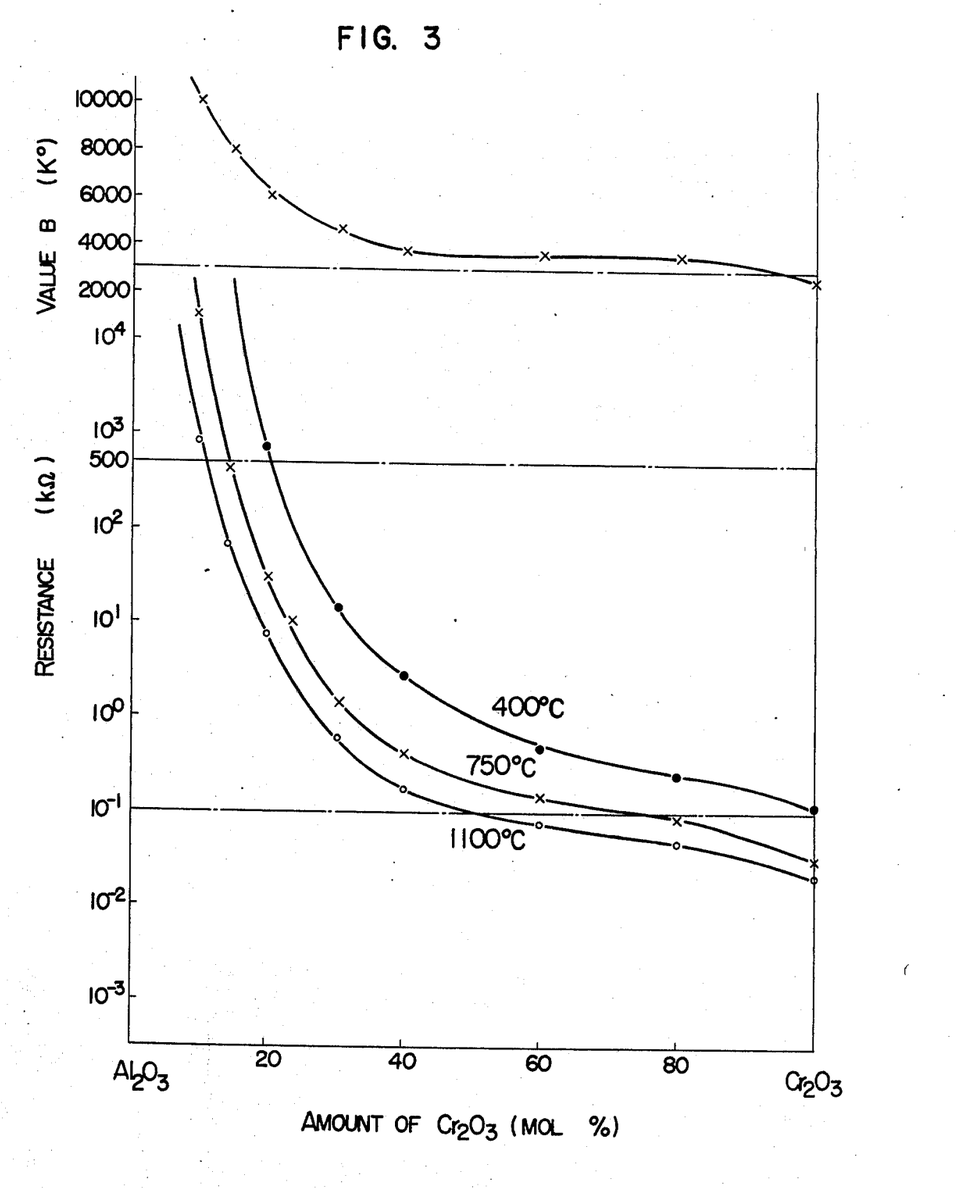
FIG. 3 is a characteristic diagram which shows relations between mixing ratio of $Al_2O_3$ and $Cr_2O_3$ and resistance and value B and which is used for explanation of the first embodiment of the present invention.

Next, ranges of amounts of $Al_2O_3$ and $Cr_2O_3$ which satisfy the value B of 3,000° − 20,000°K and the resistance of 0.1 − 500 K$\Omega$ at a temperature of 400° − 1,100°C were examined. The results are shown in FIG. 3 wherein lower limit of value B and upper and lower limits of resistance are indicated by solid lines. In FIG. 3, abscissa axis indicates amount of $Cr_2O_3$ (mol %) and ordinate axis indicates resistance and value B. The abscissa axis is uniform scale and resistance on the ordinate axis is indicated by logarithmic scale and value B is by uniform scale. Judging from FIG. 3 and Table 1, amount of $Cr_2O_3$ which satisfies the value B of 3,000° − 20,000°K is about 10 − 94 mol %. Amount of $Cr_2O_3$ which satisfies the resistance of 0.1 − 500 K$\Omega$ at 400°C is 20.7 − 100 mol %. Thus, amount of $Cr_2O_3$ which satisfies both value B and resistance at 400°C is 20.7 − 94 mol %. On the other hand, since amount of $Cr_2O_3$ which satisfies the resistance of 0.1 − 500 K$\Omega$ at 1,100°C is 11 − 50 mol %, amount of $Cr_2O_3$ which satisfies both value B and resistance at 1,100°C is 11 − 50 mol %. From these results, amount of $Cr_2O_3$ which satisfies both value B of 3,000° − 20,000°K and resistance of 0.1 − 500 K$\Omega$ at 400° − 1,100°C is 11 − 94 mol %. That is, when amount of $Cr_2O_3$ is less than 11 mol %, the thermistor can be used at 1,100°C, but cannot be used at 750°C and 400°C (because the resistance exceeds the upper limit 500 K$\Omega$) and when amount of $Cr_2O_3$ is more than 94 mol %, the thermistor can be used at 400°C, but cannot be used at 1,100°C and 750°C (because the resistance is lower than the lower limit 0.1 K$\Omega$). When amount of $Cr_2O_3$ is selected from the range of 11 − 94 mol %, the thermistor can be used at a temperature of 400° − 1,100°C. As a result, $Al_2O_3$ occupies the remaining 89 − 6 mol %. Therefore, when the heat resisting resistor made of a mixture comprising 11 − 94 mol % of $Cr_2O_3$ and 89 − 6 mol % of $Al_2O_3$ is used in a high temperature thermistor, the first object of the present invention can be attained. This is the first embodiment of the present invention.

The heat resisting test was carried out only on the mixing ratio of $Al_2O_3$ and $Cr_2O_3$ of Samples No. 1 − 5. However, in view of the results of the heat resisting test as shown in Table 1, it can be presumed that good heat resistance will be obtained on any mixing ratios within the ranges of 11 − 94 mol % of $Cr_2O_3$ and 89 − 6 mol % of $Al_2O_3$.

The second embodiment of the present invention will be explained below.

In this embodiment, influence of addition of $CaCO_3$ and $SiO_2$ capable of accelerating the sintering of the compound of $Al_2O_3$ and $Cr_2O_3$ as explained in the first embodiment of the heat resistance was investigated. Therefore, examination was not made on various mixing ratios of $Al_2O_3$ and $2O_3$ within the ranges of 89 − 6 mol % for the former and 11 − 94 mol % for the latter, but only the mixing ratio of 50 mol % of $Al_2O_3$ and 50 mol % of $Cr_2O_3$ was dealt with in this embodiment. Size and shape of heat resisting resistor and materials and size of electrode employed in this embodiment are the same as those in the first embodiment. The results are shown in Table 2.

As is clear from Table 2, when CaO and $SiO_2$ were respectively added in an amount of less than 2 % and more than 20 % based on the weight of the mixture of $Al_2O_3$ and $Cr_2O_3$, changing rate of resistance after subjected to heat resisting test was great. Therefore, amount of $CaCO_3$ and $SiO_2$ should respectively be 2 − 20 % by weight of the mixture of $Al_2O_3$ and $Cr_2O_3$. Within said range, acceleration of sintering of the mixture consisting of $Al_2O_3$ and $Cr_2O_3$ can be attained without causing reduction in heat resistance.

As mentioned above, according to the first and second embodiments of the present invention, even when the thermistor is used at a high temperature for a long period of time, changing rate of resistance is very small and in addition it has an excellent heat resistance. Furthermore, the thermistor satisfies the value B of 3,000° − 20,000°K and the resistance of 0.1 K$\Omega$ and 500 K$\Omega$ required for ordinary control of temperature, at a temperature of 400° − 1,100°C.

Next, researches were made on compositions of heat resisting resistor which satisfy the value B of 6,000° − 18,000°K and the resistance of 0.1 − 50 K$\Omega$ required for accurate control of temperature at 400° − 1,100°C.

First, said $Al_2O_3$ and $Cr_2O_3$ were employed in view of the requirement of good heat resistance at a high temperature and it was attempted to add a third component for adjusting the value B and the resistance. That is, it was intended to obtain a value B of 6,000° – 18,000°K and a resistance of 0.1 – 50 KΩ by addition of the third component. As the result of researches on such third component taking the heat resistance and cost into consideration, it has been found that $MnO_2$ and $TiO_2$ are suitable as the third component.

From the above results, the third and fourth embodiments of the present invention will be explained below.

For the third embodiment, $Al_2O_3$, $Cr_2O_3$, $CaCO_3$, $SiO_2$ and $MnO_2$ were respectively prepared and $Al_2O_3$, $Cr_2O_3$ and $MnO_2$ in various amounts were mixed with $CaCO_3$ and $SiO_2$ in a fixed amount to make a total of 100 mol % ($CaCO_3$ was calculated as CaO). High temperature thermistors were produced from the mixtures in the same manner as in the first embodiment. Initial resistance and value B of these thermistors were measured in the same manner as in the first embodiment and then were subjected to heat resisting test in the same manner as in the first embodiment. The results are shown in Table 3.

Figure 4:
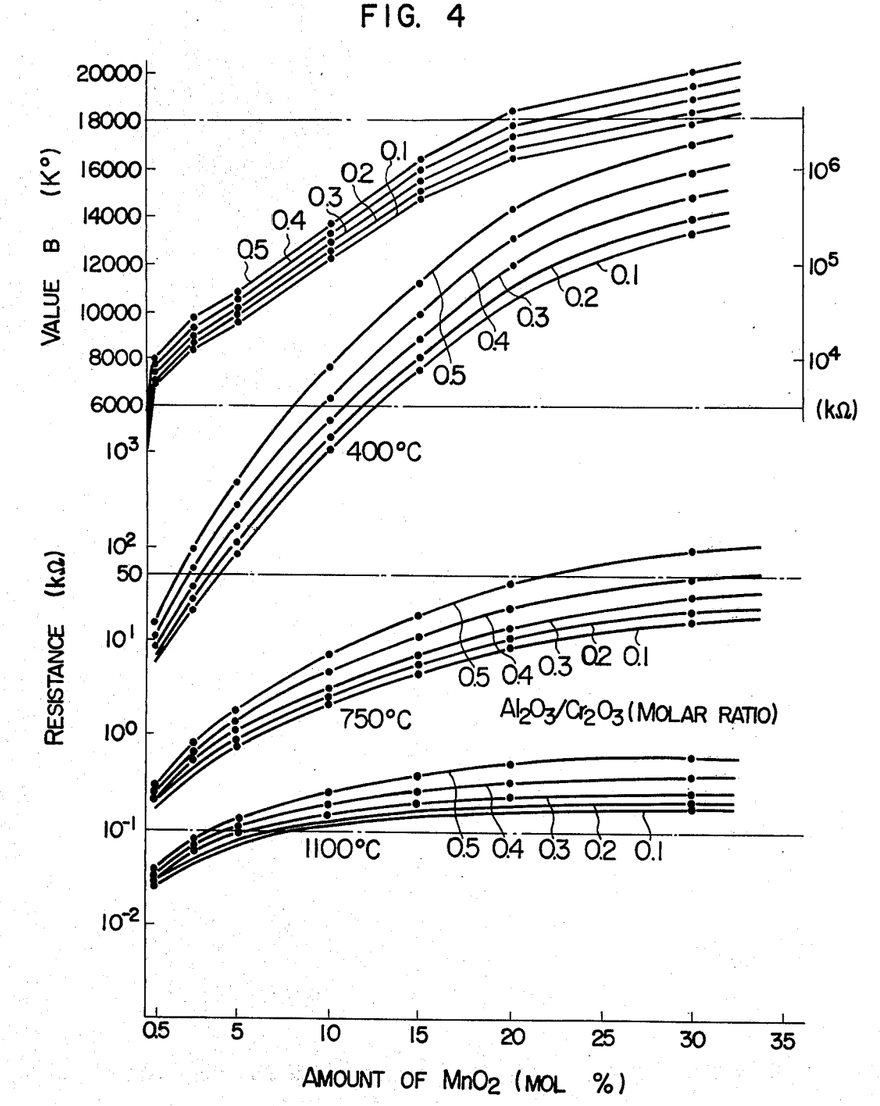
FIG. 4 is a characteristic diagram which shows relations between amount of $MnO_2$ and resistance and value B and which is used for explanation of the third embodiment of the present invention.

As is clear from Table 3, the changing rate of the resistance is within the range of ±5 %. Moreover, there are no substantial differences in the changing rate of the resistance between the results in Tables 1 and 3. Therefore, it is recognized that the presence of $MnO_2$ does not greatly affect the heat resistance. It is also recognized from Table 3 that value B and resistance change with change of amount of $MnO_2$. In view of the results as shown in Table 3, examination was made by changing the amount of $MnO_2$ in an attempt to attain the second object. The results are shown in FIG. 4 wherein the abscissa axis indicates amount of $MnO_2$ (mol %) and the ordinate axis indicates resistance and value B. The abscissa axis is uniform scale and resistance on the ordinate axis is indicated by logarithmic scale and value B by uniform scale.

From FIG. 4, amount of $MnO_2$ which satisfies the resistance of 0.1 – 50 KΩ and the value B of 6,000° – 18,000°K at a temperature of 400° – 1,100°C was examined. Upper and lower limits of the resistance and value B are shown by solid lines. In FIG. 4, the third embodiment was carried out on the basis of the first embodiment. Conclusion of the first embodiment was that $Cr_2O_3$ should be in an amount of 11 – 94 mol % and $Al_2O_3$ should be in an amount of 89 – 6 mol % and molar ratio $Al_2O_3/Cr_2O_3$ is 89/11 – 6/94 ≈ 9 – 0.064. In this third embodiment, a molar ratio of 0.1 – 0.5 was employed.

As is clear from FIG. 4, resistance and value B vary depending upon the molar ratio $Al_2O_3/Cr_2O_3$ at the same amount of $MnO_2$. Amount of $MnO_2$ which satisfies the value B of 6,000° – 18,000°K is 0.25 – 30 mol % at a molar ratio of 0.1, 0.19 – 26.75 mol % at 0.2, 0.19 – 25 mol % at 0.3, 0.19 – 20.5 mol % at 0.4 and 0.25 – 17.5 mol % at 0.5. Therefore, when amount of $MnO_2$ is not more than 30 mol %, upper limit of value B at a molar ratio of 0.1 – 0.5 is satisfied. Amount of $MnO_2$ which satisfies the lower limit of value B varies depending upon the molar ratio as mentioned above, but when the amount of $MnO_2$ is too small, addition of $MnO_2$ as third component becomes meaningless and the lower limit is considered to be 0.5 mol %. Thus, amount of $MnO_2$ which satisfies the value B of 6,000° – 18,000°K is 0.5 – 30 mol %.

Amount of $MnO_2$ which satisfies the resistance of 0.1 – 50 KΩ at 400°C also varies depending upon the molar ratio $Al_2O_3/Cr_2O_3$. That is, such amount of $MnO_2$ is 0 – 4 mol % at a molar ratio of 0.1, 0 – 3.8 mol % at 0.2, 0 – 3 mol % at 0.3, 0 – 2.25 mol % at 0.4 and 0 – 1.75 mol % at 0.5. Therefore, when the amount of $MnO_2$ is 0 – 4 mol %, the range of resistance of 0.1 – 50 KΩ at a molar ratio of 0.1 – 0.5 is satisfied. Moreover, it is recognized that amount of $MnO_2$ which satisfies the resistance of 0.1 – 50 KΩ is more than 4 mol % at a molar ratio of said about 0.064. Furthermore, it can be presumed that at a molar ratio of more than 0.5, the resistance of 0.1 – 50 KΩ is satisfied when the amount of $MnO_2$ is 0 – 4 mol %. From the above results, amount of $MnO_2$ which satisfies both the resistance of 0.1 – 50 KΩ and the value B of 6,000° – 18,000°K at 400°C is 0.5 – 4 mol %.

On the other hand, amount of $MnO_2$ which satisfies the resistance of 0.1 – 50 KΩ at 1,100°C is not less than 3.75 mol % determined in the same manner as in determination of the amount at 400°C. Therefore, amount of $MnO_2$ which satisfies both the resistance of 0.1 – 50 KΩ and value B of 6,000° – 18,000°K at 1,100°C is 3.75 – 30 mol %.

That is, amount of $MnO_2$ which satisfies both the value B of 6,000° – 18,000°K and the resistance of 0.1 – 50 KΩ at a temperature of 400° – 1,100°C is 0.5 – 30 mol %. In other words, when the amount of $MnO_2$ is less than 0.5 mol %, the thermistor can be used at 400°C and 750°C, but cannot be used at 1,100°C (because the upper limit 0.1 KΩ of resistance is not satisfied) and when the amount of $MnO_2$ is more than 30 mol %, the thermistor can be used at 1,100°C, but cannot be used at 400°C and 750°C (because the resistance exceeds the upper limit 50 KΩ). However, when the amount of $MnO_2$ is within the range of 0.5 – 30 mol %, the thermistor can be used at a temperature of 400° – 1,100°C.

The amount of $MnO_2$ means the amount based on the total amount of $Cr_2O_3$, $Al_2O_3$, $SiO_2$, CaO and $MnO_2$ which is taken as 100. Since the amount of $MnO_2$ is 0.5 – 24 mol %, the remaining 99.5 – 76 mol % comprises $Cr_2O_3$, $Al_2O_3$, CaO and $SiO_2$. In this embodiment, CaO and $SiO_2$ were used as components of heat resisting resistor, but these were used for acceleration of sintering and may not be used. However, naturally $Al_2O_3$ and $Cr_2O_3$ are necessary besides $MnO_2$.

The fourth embodiment which used $TiO_2$ as the third component will explained below.

$Al_2O_3$, $Cr_2O_3$, CaO, $SiO_2$, and $TiO_2$ were respectively prepared. $Al_2O_3$, $Cr_2O_3$ and $TiO_2$ in various amounts were mixed with a fixed amount of CaO and $SiO_2$ to make the total amount 100 mol %. High temperature thermistors were produced from said mixtures in the same manner as employed in the first embodiment. Initial resistance and value B of the thermistors were measured in the same manner as employed in the first embodiment and subjected to heat resisting test. The results are shown in Table 4.

As is clear from Table 4, changing rate of resistance after the heat resisting test is within the range of ±5 % except a few examples. However, when amount of $TiO_2$ exceeds 50 mol % (Sample No. 5), $TiO_2$ becomes predominant and hence value B decreases to less than 6,000°K. Thus, stability obtained from complete solid solution of $Al_2O_3$—$Cr_2O_3$ is lost to cause reduction in heat resistance. When amount of $TiO_2$ is too small, effect of addition of $TiO_2$ on value B is not recognized (see Sample No. 6) and value B decreases to less than 6,000°K. In this case, when amount of $Al_2O_3$ is extremely increased, value B can be increased, but resistance is also increased (e.g., 100 KΩ at 750°C) and accurate control of temperature cannot be attained.

Figure 5:
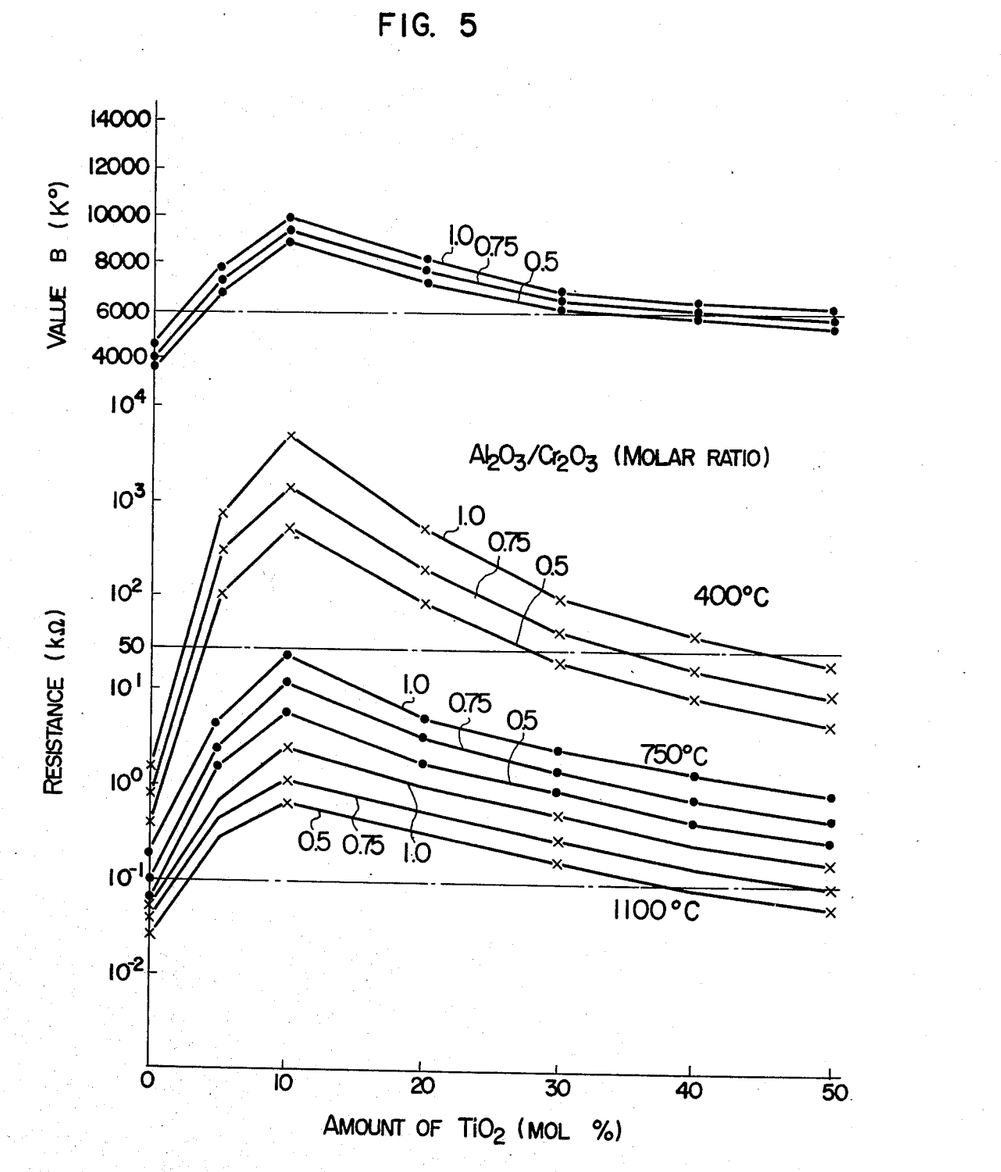
FIG. 5 is a characteristic diagram which shows relation between amount of $TiO_2$ and resistance and value B and which is used for explanation of the fourth embodiment.

Next, experiments were made on value B and resistance at 400°C, 750°C and 1,100°C with changing the proportion of $TiO_2$ from the results of Table 4. The results are shown in FIG. 5, wherein the abscissa axis shows amount (mol %) of $TiO_2$ and the ordinate axis shows resistance and value B. The abscissa axis is uniform scale and resistance on the ordinate axis is shown by logarithmic scale and value B on the ordinate axis is shown by uniform scale.

Amount of $TiO_2$ which satisfies the resistance of 0.1 – 50 KΩ and the value B of 6,000° – 18,000°K at a temperature of 400° – 1,100°C was examined from FIG. 5.

Upper and lower limits of resistance and value B are shown by solid lines in FIG. 5. In FIG. 5, this fourth embodiment was based on the first embodiment. That is, conclusion in the first embodiment was that $Cr_2O_3$ is 11 – 94 mol % and $Al_2O_3$ is 89 – 6 mol % and molar ratio $Al_2O_3/Cr_2O_3$ is 89/11 – 6/94 ≈ 9 – 0.064. Thus, the molar ratios 0.5, 0.75 and 1.0 were employed in this fourth embodiment.

As is recognized from FIG. 5, resistance and value B vary depending upon the molar ratio $Al_2O_3/Cr_2O_3$ at the same amount of $TiO_2$.

First, amount of $TiO_2$ which satisfies the value B of 6,000° – 18,000°K was examined. As is seen from FIG. 5, value B and resistance increase with increase in the amount of $TiO_2$ until 10 mol % and they decrease when the amount of $TiO_2$ exceeds 10 mol %. Therefore, amount of $TiO_2$ was determined in corresponding to value B of from the lower limit to the upper limit. When the molar ratio $Al_2O_3/Cr_2O_3$ is 0.5, the amount of $TiO_2$ is 3.75 – 40 mol %, when it is 0.75, the amount is 2.6 – 50 mol % and when it is 1.0, the amount is 2 – 50 mol % or more. When the molar ratio is 1.0, even when $TiO_2$ exceeds 50 mol %, value B does not lower below the lower limit. However, from the results of Table 4, when amount of $TiO_2$ exceeds 50 mol %, heat resistance decreases and so the amount of $TiO_2$ must not exceed 50 mol %. Judging from these results, when amount of $TiO_2$ is chosen from the range of 2 – 50 mol %, the value B of 6,000° – 18,000°K is satisfied at the molar ratios of 0.5, 0.75 and 1.0. It can be presumed from inclination of lines of value B in FIG. 5 that amount of $TiO_2$ which satisfies the value B of 6,000° – 18,000°K at the molar ratio of about 0.064 referred to above can be suitably chosen from the range of 2 – 50 mol %. Moreover, amount of $TiO_2$ which satisfies the value B of 6,000° – 18,000°K at a molar ratio of more than 1.0 can be presumed to be 2 mol % or less – 50 mol %. In this case, however, when amount of $TiO_2$ is, for example, 1 mol % which is less than 2 mol %, the value B is 5,200°K which is less than 6,000°K as seen from Sample No. 4 in Table 4 and is not suitable. Furthermore, comparison of Sample No. 4 and Sample No. 6 in Table 4 shows that Sample No. 6 has a value B of 4,900°K while Sample No. 4 which has the same compositions as Sample No. 6 except that amount of $TiO_2$ is larger by 0.6 mol % than that of Sample No. 6 has a value B of 5,200°K. From this fact it is understood that a value B of 6,000°K cannot be obtained unless the amount of $TiO_2$ is as high as about 2 mol %.

From these results, amount of $TiO_2$ which satisfies the value B of 6,000° – 18,000°K is 2 – 50 mol %.

On the other hand, amount of $TiO_2$ which satisfies the resistance of 0.1 – 50 KΩ at 400°C also varies depending upon the molar ratio $Al_2O_3/Cr_2O_3$. That is, when the molar ratio is 0.5, the amount of $TiO_2$ is 0 – 50 mol % or more (not less than 0 mol %), when the ratio is 0.75, the amount is also not less than 0 mol % and when the ratio is 1.0, the amount is also not less than 0 mol %. Therefore, when the amount of $TiO_2$ is not less than 0 mol %, resistance of 0.1 – 50 KΩ can be satisfied at the molar ratios of 0.5, 0.75 and 1.0. However, the amount of $TiO_2$ exceeds 50 mol %, heat resistance is deteriorated. Thus, amount of $TiO_2$ should be within the range of 0 – 50 mol %. From FIG. 5, it is presumed that amount of $TiO_2$ which satisfies the resistance of 0.1 – 50 KΩ at the molar ratio of about 0.064 referred to hereinbefore is also within the range of 0 – 50 mol %. Furthermore, amount of $TiO_2$ which satisfies the resistance of 0.1 – 50 KΩ at a molar ratio of more than 1.0 is also within the range of 0 – 50 mol %.

From the above results, amount of $TiO_2$ which satisfies the resistance of 0.1 – 50 KΩ at 400°C is 0 – 50 mol %.

Thus, amount of $TiO_2$ which satisfies both the resistance of 0.1 – 50 KΩ and the value B of 6,000° – 18,000°K at 400°C is 2 – 50 mol %.

On the other hand, amount of $TiO_2$ which satisfies the resistance of 0.1 – 50 KΩ at 1,100°C is 1.0 – 50 mol % determined in the same manner as in determination of amount of $TiO_2$ at 400°C. Therefore, amount of $TiO_2$ which satisfies both the resistance of 0.1 – 50 KΩ and the value B of 6,000° – 18,000°K at 1,100°C is 2 – 50 mol %.

Thus, amount of $TiO_2$ which satisfies both the resistance of 0.1 – 50 KΩ and the value B of 6,000° – 18,000°K at a temperature of 400° – 1,100°C is 2 – 50 mol %.

That is, when the amount of $TiO_2$ is less than 2 mol %, the thermistor can be used at 400°C and 750°C, but cannot be used at 1,100°C (because the resistance becomes less than 0.1 KΩ) and when the amount of $TiO_2$ is more than 50 mol %, the thermistor can be used at 400°C, but cannot be used at 750°C and 1,100°C (because the resistance becomes less than 0.1 KΩ). However, when the amount of $TiO_2$ is within the range of 2 – 50 mol %, the thermistor can be used at a temperature of 400° – 1,100°C.

Amount of $TiO_2$ means the amount based on the total amount of $Cr_2O_3$, $Al_2O_3$, $SiO_2$, CaO and $TiO_2$ which is taken as 100. Since the amount of $TiO_2$ is 2.0 – 50 mol %, the remaining 98 – 50 mol % comprises the compositions of $Cr_2O_3$, $Al_2O_3$, CaO and $SiO_2$. The CaO and $SiO_2$ are used for acceleration of sintering and these may not be used. However, it is natural that $Cr_2O_3$ and $Al_2O_3$ are necessary.

As mentioned above, according to the third and fourth embodiments, changing rate of resistance is very small even when the thermistor is used at a high temperature for a long period of time and thus, it is excellent in heat resistance. Furthermore, the value B of 6,000° – 18,000°K and the resistance of 0.1 – 50 K Ω required for accurate control of temperature at 400° – 1,100°C can be satisfied.

Although columnar heat resisting resistors of high temperature thermistors have been specifically stated in the above description of embodiments of the present invention, the shape of the resistors is not limited to columnar shape, but other shapes such as disc and the like may be employed.

Furthermore, the electrodes may be made of platinum-rhodium, platinum-palladium, platinum-iridium, etc. besides platinum.

Table 1

| Sample No. | Compositions (mol %) | | Resistance (KΩ) 750°C | Resistance (KΩ) 650°C | Value B (°K) | Time Temperature | Heat resisting test 100 Hr | Heat resisting test 500 Hr | Heat resisting test 1000 Hr |
|---|---|---|---|---|---|---|---|---|---|
| 1 | $Al_2O_3$ | 80 | 32.3 | 61.5 | 6100 | 1100°C | −0.9% | −2.4% | −4.1% |
|   | $Cr_2O_3$ | 20 |      |      |      | 900°C  | −1.4  | −1.1  | −0.2  |
|   |           |    |      |      |      | 700°C  | +1.8  | +0.8  | −0.8  |
| 2 | $Al_2O_3$ | 50 | 0.224 | 0.331 | 3700 | 1100°C | −1.8 | −2.8 | −4.7 |
|   | $Cr_2O_3$ | 50 |       |       |      | 900°C  | −0.7 | +0.1 | +0.6 |
|   |           |    |       |       |      | 700°C  | −1.1 | +0.3 | +0.7 |
| 3 | $Al_2O_3$ | 20 | 0.092 | 0.135 | 3600 | 1100°C | −1.4 | −3.6 | −5.0 |
|   | $Cr_2O_3$ | 80 |       |       |      | 900°C  | −0.8 | −0.2 | +0.3 |
|   |           |    |       |       |      | 700°C  | +0.5 | +1.2 | −0.3 |
| 4 | $Al_2O_3$ | 88 | 2950 | 7650 | 9000 | 1100°C | −1.6 | −2.2 | −3.9 |
|   | $Cr_2O_3$ | 12 |      |      |      | 900°C  | −1.1 | −0.6 | −0.8 |
|   |           |    |      |      |      | 700°C  | −0.2 | +0.8 | +1.3 |
| 5 | $Al_2O_3$ | 10 | 0.062 | 0.087 | 3200 | 1100°C | −2.8 | −4.5 | −6.7 |
|   | $Cr_2O_3$ | 90 |       |       |      | 900°C  | −1.4 | −2.6 | −1.9 |
|   |           |    |       |       |      | 700°C  | −0.8 | +0.7 | +1.8 |

Table 2

| Sample No. | Compositions | | Resistance (KΩ) | Value B (°K) | Time Temperature | Heat resisting test 100 Hr | Heat resisting test 500 Hr | Heat resisting test 1000 Hr |
|---|---|---|---|---|---|---|---|---|
| 1 | $Al_2O_3$ | 50 mol % | 750°C 0.583 |      | 1100°C | −8.5% | −18.1% | −27.6% |
|   | $Cr_2O_3$ | 50 mol % |             | 3400 | 900°C  | −4.6  | −9.5   | −17.2  |
|   | CaO       | 1.0 weight % | 650°C 0.835 |      | 700°C  | −3.1  | −6.1   | −10.5  |
|   | $SiO_2$   | 1.0 weight % |             |      |        |       |        |        |
| 2 | $Al_2O_3$ | 50 | 750°C 0.722 |      | 1100°C | −1.8 | −2.8 | −4.7 |
|   | $Cr_2O_3$ | 50 |             | 3600 | 900°C  | −0.7 | +0.1 | +0.6 |
|   | CaO       | 3  | 650°C 1.267 |      | 700°C  | +1.1 | +0.3 | +0.7 |
|   | $SiO_2$   | 7  |             |      |        |      |      |      |
| 3 | $Al_2O_3$ | 50 | 750°C 1.325 |      | 1100°C | −0.9 | −1.7 | −3.1 |
|   | $Cr_2O_3$ | 50 |             | 3900 | 900°C  | −0.5 | −0.7 | +1.0 |
|   | CaO       | 8  | 650°C 1.996 |      | 700°C  | +0.3 | −0.7 | +0.1 |
|   | $SiO_2$   | 12 |             |      |        |      |      |      |
| 4 | $Al_2O_3$ | 50 | 750°C 2.034 |      | 1100°C | −1.2 | −2.4 | −4.6 |
|   | $Cr_2O_3$ | 50 |             | 4500 | 900°C  | −0.7 | −1.0 | −1.7 |
|   | CaO       | 12 | 650°C 3.260 |      | 700°C  | +0.4 | +0.8 | −0.3 |
|   | $SiO_2$   | 18 |             |      |        |      |      |      |
| 5 | $Al_2O_3$ | 50 | 750°C 0.624 |      | 1100°C | −2.5 | −6.2 | −8.7 |
|   | $Cr_2O_3$ | 50 |             | 3500 | 900°C  | −1.8 | −3.1 | −5.6 |
|   | CaO       | 2  | 650°C 0.956 |      | 700°C  | −0.9 | −1.5 | −2.3 |
|   | $SiO_2$   | 2  |             |      |        |      |      |      |
| 6 | $Al_2O_3$ | 50 | 750°C 2.92 |      | 1100°C | −1.3 | −2.6 | −4.1 |
|   | $Cr_2O_3$ | 50 |            | 5400 | 900°C  | −0.7 | −0.9 | −1.6 |
|   | CaO       | 20 | 650°C 5.17 |      | 700°C  | −0.8 | −0.4 | −1.1 |
|   | $SiO_2$   | 20 |            |      |        |      |      |      |
| 7 | $Al_2O_3$ | 50 | 750°C 4.15 |      | 1100°C | −5.4 | −10.3 | −16.8 |
|   | $Cr_2O_3$ | 50 |            | 6300 | 900°C  | −3.1 | −5.6  | −9.2  |
|   | CaO       | 25 | 650°C 8.09 |      | 700°C  | −1.6 | −2.5  | −4.1  |
|   | $SiO_2$   | 25 |            |      |        |      |       |       |

Table 3

| Sample No. | Compositions (mol %) | | Resistance (KΩ) 750°C | Resistance (KΩ) 650°C | Value B (°K) | Time Temperature | Heat resisting test 100 Hr | Heat resisting test 500 Hr | Heat resisting test 1000 Hr |
|---|---|---|---|---|---|---|---|---|---|
| 1 | $Al_2O_3$ | 18.3 | 62.5 | 477 | 19200 | 1100°C | −1.2% | −2.9% | −4.2% |
|   | $Cr_2O_3$ | 36.7 |      |     |       | 900°C  | −0.8  | −1.3  | −0.2  |
|   | $MnO_2$   | 25   |      |     |       |        |       |       |       |

Table 3-continued

| Sample No. | Compositions (mol %) | | Resistance (KΩ) 750°C | Resistance (KΩ) 650°C | Value B (°K) | Time Temperature | Heat resisting test 100 Hr | Heat resisting test 500 Hr | Heat resisting test 1000 Hr |
|---|---|---|---|---|---|---|---|---|---|
| | CaO | 10 | | | | | | | |
| | SiO₂ | 10 | | | | 700°C | −0.3 | +0.8 | +1.2 |
| 2 | Al₂O₃ | 16.7 | | | | 1100°C | −0.9 | −2.2 | −3.9 |
| | Cr₂O₃ | 33.8 | | | | | | | |
| | MnO₂ | 30 | 89.6 | 745 | 20000 | 900°C | +0.8 | −0.9 | −0.3 |
| | CaO | 10 | | | | | | | |
| | SiO₂ | 10 | | | | 700°C | ±0.0 | −0.6 | +0.7 |
| 3 | Al₂O₃ | 23.5 | | | | 1100°C | −1.2 | −2.4 | −4.6 |
| | Cr₂O₃ | 47.0 | | | | | | | |
| | MnO₂ | 0.5 | 0.292 | 0.683 | 8000 | 900°C | −0.2 | −0.8 | −1.1 |
| | CaO | 10 | | | | | | | |
| | SiO₂ | 10 | | | | 700°C | −0.6 | +0.2 | +1.2 |
| 4 | Al₂O₃ | 23.6 | | | | 1100°C | −0.8 | −3.9 | −5.5 |
| | Cr₂O₃ | 47.2 | | | | | | | |
| | MnO₂ | 0.2 | 0.121 | 0.224 | 5800 | 900°C | −0.2 | −1.1 | −2.1 |
| | CaO | 10 | | | | | | | |
| | SiO₂ | 10 | | | | 700°C | −0.2 | −0.2 | +0.8 |
| 5 | Al₂O₃ | 25 | | | | 1100°C | −1.6 | −2.3 | −4.8 |
| | Cr₂O₃ | 50 | | | | | | | |
| | MnO₂ | 5 | 1.78 | 5.65 | 10900 | 900°C | −1.2 | −1.6 | −0.8 |
| | CaO | 10 | | | | | | | |
| | SiO₂ | 10 | | | | 700°C | +0.5 | +1.2 | −0.1 |
| 6 | Al₂O₃ | 18.6 | | | | 1100°C | −2.4 | −3.3 | −4.4 |
| | Cr₂O₃ | 46.4 | | | | | | | |
| | MnO₂ | 15.0 | 19.2 | 109 | 16400 | 900°C | −0.5 | +1.1 | +0.7 |
| | CaO | 10 | | | | | | | |
| | SiO₂ | 10 | | | | 700°C | −0.3 | +1.2 | −0.8 |
| 7 | Al₂O₃ | 26 | | | | 1100°C | −1.8 | −1.9 | −3.8 |
| | Cr₂O₃ | 52 | | | | | | | |
| | MnO₂ | 2 | 0.682 | 1.84 | 9400 | 900°C | +1.5 | +0.8 | +1.1 |
| | CaO | 10 | | | | | | | |
| | SiO₂ | 10 | | | | 700°C | +1.3 | −1.2 | −0.5 |

Table 4

| Sample No. | Compositions (mol %) | | Resistance (KΩ) 750°C | Resistance (KΩ) 650°C | Value B (°K) | Time Temperature | Heat resisting test 100 Hr | Heat resisting test 500 Hr | Heat resisting test 1000 Hr |
|---|---|---|---|---|---|---|---|---|---|
| 1 | Al₂O₃ | 25 | | | | 1100°C | −2.6% | −4.1% | −5.0% |
| | Cr₂O₃ | 25 | | | | | | | |
| | TiO₂ | 30 | 2.53 | 5.31 | 7000 | 900°C | −1.1 | −0.3 | +1.2 |
| | CaO | 10 | | | | | | | |
| | SiO₂ | 10 | | | | 700°C | −0.8 | −0.7 | +0.1 |
| 2 | Al₂O₃ | 23.3 | | | | 1100°C | −1.8 | −2.1 | −4.1 |
| | Cr₂O₃ | 46.7 | | | | | | | |
| | TiO₂ | 10 | 7.25 | 18.8 | 9000 | 900°C | +1.4 | +1.2 | +0.5 |
| | CaO | 10 | | | | | | | |
| | SiO₂ | 10 | | | | 700°C | −0.2 | +0.8 | +0.1 |
| 3 | Al₂O₃ | 12.9 | | | | 1100°C | −1.5 | −3.8 | −4.9 |
| | Cr₂O₃ | 17.1 | | | | | | | |
| | TiO₂ | 50 | 0.523 | 0.986 | 6000 | 900°C | −1.4 | −1.6 | −0.9 |
| | CaO | 10 | | | | | | | |
| | SiO₂ | 10 | | | | 700°C | +0.6 | +0.6 | −1.0 |
| 4 | Al₂O₃ | 39.5 | | | | 1100°C | −0.9 | −3.6 | −4.7 |
| | Cr₂O₃ | 39.5 | | | | | | | |
| | TiO₂ | 1 | 0.382 | 0.662 | 5200 | 900°C | −1.0 | +0.2 | −1.6 |
| | CaO | 10 | | | | | | | |
| | SiO₂ | 10 | | | | 700°C | +0.8 | +0.3 | −0.2 |
| 5 | Al₂O₃ | 10 | | | | 1100°C | −4.7 | −8.6 | −15.2 |
| | Cr₂O₃ | 10 | | | | | | | |
| | TiO₂ | 60 | 0.612 | 1.12 | 5700 | 900°C | −1.6 | −2.8 | −4.9 |
| | CaO | 10 | | | | | | | |
| | SiO₂ | 10 | | | | 700°C | −0.8 | −1.2 | −0.3 |
| 6 | Al₂O₃ | 39.8 | | | | 1100°C | −2.2 | −2.8 | −3.9 |
| | Cr₂O₃ | 39.8 | | | | | | | |
| | TiO₂ | 0.4 | 0.225 | 0.378 | 4900 | 900°C | −1.3 | −0.5 | −2.4 |
| | CaO | 10 | | | | | | | |
| | SiO₂ | 10 | | | | 700°C | +0.2 | +0.4 | −0.5 |

What is claimed is:

1. In a high temperature thermistor comprising a heat resisting resistor having a negative resistance-temperature characteristic and two electrodes connected to said heat resisting resistor, the improvement in that said heat resisting resistor comprises a mixture of $Al_2O_3$ and $Cr_2O_3$, the proportion of $Al_2O_3$ and $Cr_2O_3$ in the mixture being 89–6 mol % of $Al_2O_3$ and 11–94 mol % of $Cr_2O_3$.

2. A high temperature thermistor according to claim 1 consisting essentially of one of (a) a mixture of 89 – 6 mol % of $Al_2O_3$ and 11 – 94 mol % of $Cr_2O_3$, (b) a mixture of (a) with 2 – 20% of calcium oxide and 2 – 20% of silicon oxide based on the weight of (a), (c) a mixture of 50 – 98 mol % of (a) and 50 – 2 mol % of titanium dioxide, and (d) a mixture of 70 – 99.5 mol % of (a) and 30 – 0.5 mol % of manganese dioxide.

3. A high temperature thermistor according to claim 1, wherein the mixture additionally contains 2 – 20% of calcium oxide and 2 – 20% of silicon oxide based on the weight of the mixture of $Al_2O_3$ and $Cr_2O_3$.

4. A high temperature thermistor according to claim 1, wherein the heat resisting resistor comprises 70 – 99.5 mol % of the mixture of $Al_2O_3$ and $Cr_2O_3$ and 30 – 0.5 mol % of manganese oxide.

5. A high temperature thermistor according to claim 1, wherein the heat resisting resistor comprises 50 – 98 mol % of the mixture of $Al_2O_3$ and $Cr_2O_3$ and 50 – 2 mol % of titanium oxide.

6. A high temperature thermistor according to claim 4, wherein the heat resisting resistor additionall contains silicon oxide ($SiO_2$) and calcium oxide (CaO).

7. A high temperature thermistor according to claim 5, wherein the heat resisting resistor additionally contains silicon oxide and calcium oxide.

* * * * *